(12) United States Patent
Sugimoto et al.

(10) Patent No.: US 11,637,287 B2
(45) Date of Patent: Apr. 25, 2023

(54) POSITIVE ELECTRODE MATERIAL AND BATTERY USING SAME

(71) Applicant: Panasonic Intellectual Property Management Co., Ltd., Osaka (JP)

(72) Inventors: Yuta Sugimoto, Hyogo (JP); Ryuichi Natsui, Osaka (JP); Izuru Sasaki, Kyoto (JP); Akinobu Miyazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 321 days.

(21) Appl. No.: 16/930,430

(22) Filed: Jul. 16, 2020

(65) Prior Publication Data

US 2020/0350621 A1 Nov. 5, 2020

Related U.S. Application Data

(63) Continuation of application No. PCT/JP2018/045588, filed on Dec. 12, 2018.

(30) Foreign Application Priority Data

Jan. 26, 2018 (JP) .............................. JP2018-011530

(51) Int. Cl.
*H01M 4/62* (2006.01)
*H01M 4/525* (2010.01)
(Continued)

(52) U.S. Cl.
CPC ........... *H01M 4/62* (2013.01); *H01M 4/1315* (2013.01); *H01M 4/525* (2013.01);
(Continued)

(58) Field of Classification Search
None
See application file for complete search history.

(56) References Cited

U.S. PATENT DOCUMENTS 4,352,869 A 10/1982 Mellors
5,506,073 A 4/1996 Angell et al.
(Continued)

FOREIGN PATENT DOCUMENTS

CN 105254184 A 1/2016
CN 105680048 A 6/2016
(Continued)

OTHER PUBLICATIONS

The Extended European Search Report dated Feb. 10, 2021 for the related European Patent Application No. 18902731.1.
(Continued)

*Primary Examiner* — Laura Weiner
(74) *Attorney, Agent, or Firm* — McDermott Will & Emery LLP

(57) ABSTRACT

Provided is a positive electrode material which further improves charge/discharge efficiency. The positive electrode material according to the present disclosure includes a positive electrode active material and a first solid electrolyte material. The first solid electrolyte material includes Li, M, and X, and does not include sulfur. M is at least one selected from the group consisting of metalloid elements and metal elements other than Li. X is at least one selected from the group consisting of Cl, Br, and I. The positive electrode active material includes a metal oxyfluoride.

7 Claims, 2 Drawing Sheets

(51) Int. Cl.
  *H01M 10/0525* (2010.01)
  *H01M 10/0562* (2010.01)
  *H01M 4/1315* (2010.01)
  *H01M 10/052* (2010.01)
  *H01M 4/02* (2006.01)

(52) U.S. Cl.
  CPC ..... *H01M 10/052* (2013.01); *H01M 10/0525* (2013.01); *H01M 10/0562* (2013.01); *H01M 2004/028* (2013.01); *H01M 2300/0068* (2013.01)

(56) References Cited

U.S. PATENT DOCUMENTS

| | | | |
|---|---|---|---|
| 5,714,279 | A | 2/1998 | Zajac, Jr. et al. |
| 6,428,935 | B1 | 8/2002 | Takada et al. |
| 9,160,034 | B2 | 10/2015 | Kato et al. |
| 10,008,735 | B2 | 6/2018 | Ohtomo et al. |
| 2004/0151986 | A1 | 8/2004 | Park et al. |
| 2011/0045355 | A1 | 2/2011 | Ichikawa |
| 2011/0300444 | A1 | 12/2011 | Nakamura |
| 2012/0301796 | A1 | 11/2012 | Ohtomo et al. |
| 2012/0308900 | A1 | 12/2012 | Ogasa |
| 2013/0295464 | A1 | 11/2013 | Yanagi et al. |
| 2015/0147659 | A1 | 5/2015 | Kato |
| 2016/0103232 | A1 | 4/2016 | Ouspenski et al. |
| 2016/0149259 | A1 | 5/2016 | Osada et al. |
| 2016/0156064 | A1 | 6/2016 | Miyashita et al. |
| 2016/0204467 | A1 | 7/2016 | Nogami et al. |
| 2016/0248119 | A1 | 8/2016 | Kato |
| 2016/0268630 | A1 | 9/2016 | Tsukada et al. |
| 2016/0285078 | A1 | 9/2016 | Deschamps et al. |
| 2016/0308210 | A1 | 10/2016 | Sakuda et al. |
| 2016/0359192 | A1 | 12/2016 | Homma et al. |
| 2016/0359193 | A1 | 12/2016 | Yi et al. |
| 2017/0040637 | A1 | 2/2017 | Ceder et al. |
| 2017/0179481 | A1 | 6/2017 | Yamada et al. |
| 2017/0187066 | A1 | 6/2017 | Tsujimura et al. |
| 2017/0222257 | A1 | 8/2017 | Miyashita et al. |
| 2017/0229734 | A1 | 8/2017 | Furukawa et al. |
| 2017/0288281 | A1 | 10/2017 | Chiang et al. |
| 2017/0309964 | A1 | 10/2017 | Iwamoto |
| 2018/0076452 | A1 | 3/2018 | Sasaki et al. |
| 2018/0183065 | A1 | 6/2018 | Sasaki |
| 2018/0269521 | A1 | 9/2018 | Ohtomo et al. |
| 2019/0067736 | A1 | 2/2019 | Yoshioka et al. |
| 2019/0088995 | A1 | 3/2019 | Asano et al. |
| 2019/0097266 | A1 | 3/2019 | Yamamoto et al. |
| 2020/0212481 | A1 | 7/2020 | Nagamine et al. |
| 2020/0328454 | A1 | 10/2020 | Sakai et al. |
| 2020/0328455 | A1 | 10/2020 | Sakai et al. |
| 2020/0328457 | A1 | 10/2020 | Sakai et al. |
| 2020/0328460 | A1 | 10/2020 | Asano et al. |
| 2020/0328461 | A1 | 10/2020 | Asano et al. |
| 2020/0328462 | A1 | 10/2020 | Asano et al. |
| 2020/0328464 | A1 | 10/2020 | Asano et al. |
| 2020/0328465 | A1 | 10/2020 | Sakaida et al. |
| 2020/0328468 | A1 | 10/2020 | Sakaida et al. |
| 2020/0328469 | A1 | 10/2020 | Asano et al. |
| 2020/0335817 | A1 | 10/2020 | Asano et al. |
| 2020/0350561 | A1 | 11/2020 | Kamitake et al. |
| 2020/0350615 | A1 | 11/2020 | Sakaida et al. |
| 2020/0350622 | A1 | 11/2020 | Sakaida et al. |
| 2020/0350624 | A1 | 11/2020 | Sasaki et al. |
| 2021/0151791 | A1 | 5/2021 | Oshima et al. |
| 2021/0151792 | A1 | 5/2021 | Oshima et al. |

FOREIGN PATENT DOCUMENTS

| | | |
|---|---|---|
| CN | 108701860 A | 10/2018 |
| EP | 2916381 B1 | 6/2016 |
| EP | 3043411 A1 | 7/2016 |
| EP | 3428929 A1 | 1/2019 |
| EP | 3496202 A1 | 6/2019 |
| EP | 3736827 A1 | 11/2020 |
| EP | 3736829 A1 | 11/2020 |
| EP | 3736831 A1 | 11/2020 |
| EP | 3736834 A1 | 11/2020 |
| EP | 3736899 A1 | 11/2020 |
| EP | 3745422 A1 | 12/2020 |
| EP | 3745518 A1 | 12/2020 |
| EP | 3863028 A1 | 8/2021 |
| IN | 201847045950 A | 2/2019 |
| JP | S57-132677 A | 8/1982 |
| JP | H05-306117 A | 11/1993 |
| JP | 8-171938 | 7/1996 |
| JP | H08-171938 A | 7/1996 |
| JP | H09-293516 A | 11/1997 |
| JP | H11-238528 A | 8/1999 |
| JP | 2001-052733 | 2/2001 |
| JP | 2001-052733 A | 2/2001 |
| JP | 2004-235155 A | 8/2004 |
| JP | 2006-244734 | 9/2006 |
| JP | 2006-244734 A | 9/2006 |
| JP | 2008-021556 A | 1/2008 |
| JP | 2008-060033 | 3/2008 |
| JP | 2008-234988 | 10/2008 |
| JP | 2011-129312 | 6/2011 |
| JP | 2011-253762 | 12/2011 |
| JP | 5076134 B2 | 11/2012 |
| JP | 2012-246196 A | 12/2012 |
| JP | 2013-073791 A | 4/2013 |
| JP | 2015-011901 A | 1/2015 |
| JP | 2015-032529 A | 2/2015 |
| JP | 2015-056349 A | 3/2015 |
| JP | 2016-024874 A | 2/2016 |
| JP | 2016-171067 A | 9/2016 |
| JP | 2017-059342 A | 3/2017 |
| JP | 2017-091953 A | 5/2017 |
| JP | 2017-091955 A | 5/2017 |
| JP | 2017-111954 | 6/2017 |
| JP | 2017-117753 A | 6/2017 |
| JP | 2017-518622 A | 7/2017 |
| JP | 2017-152324 A | 8/2017 |
| JP | 2017-199668 | 11/2017 |
| JP | 6222134 B2 | 11/2017 |
| JP | 2017-224474 A | 12/2017 |
| WO | 2000/028608 | 5/2000 |
| WO | 2011/073798 A2 | 6/2011 |
| WO | 2015/011937 A1 | 1/2015 |
| WO | 2015/030052 A1 | 3/2015 |
| WO | 2015/049986 A1 | 4/2015 |
| WO | 2015/136623 | 9/2015 |
| WO | 2017/047015 | 3/2017 |
| WO | 2017/108105 A1 | 6/2017 |
| WO | 2017/154766 A1 | 9/2017 |
| WO | 2017/154922 A1 | 9/2017 |
| WO | 2018/025582 A1 | 2/2018 |

OTHER PUBLICATIONS

International Search Report of PCT application No. PCT/JP2018/045588 dated Mar. 19, 2019.
Andreas Bohnsack et al., "The Bromides Li3MBr6 (M=Sm—Lu, Y): Synthesis, Crystal Structure, and Ionic Mobility", Journal of Inorganic and General Chemistry, Sep. 1997, vol. 623/Issue 9, pp. 1352-1356.
Andreas Bohnsack et al., "Ternary Chlorides of the Rare-Earth Elements with Lithium, Li3MCl6 (M=Tb—Lu, Y, Sc): Synthesis, Crystal Structures, and Ionic Motion", Journal of Inorganic and General Chemistry, Jul. 1997, vol. 623/Issue 7, pp. 1067-1073.
Tomita, Yasumasa et al. "Substitution effect in the ion conductor Li3InBr6, studied by nuclear magnetic resonance." Zeitschrift fur Naturforschung A 57.6-7 (2002): 447-450 (Year: 2002).
Tomita, Yasumasa et al. "Synthesis of Li3+ xIn1—xMxBr6 (M = Zn, Co, Fe) by Nano-grinding and their Ionic Conductivity." Transactions of the Materials Research Society of Japan 33.4 (2008):973-976 (Year: 2008).
G. J. Kipouros et al. Reversible Electrode Potentials for Formation of Solid and Liquid Chlorozirconate and Chlorohafnate Compounds (Year: 1992).

(56) References Cited

OTHER PUBLICATIONS

Indian Examination Report dated Jun. 21, 2022 for the related Indian Patent Application No. 202047027487.
William D. Richards et al., "Interface Stability in Solid-State Batteries", Chemistry of Materials, 2016, vol. 28, Dec. 7, 2015, pp. 266-273.
Fudong Han et al. "A Battery Made from a Single Material", Advanced Materials, 27 (2015), pp. 3473-3483.
International Search Report of International Application No. PCT/JP2018/045584 dated Mar. 19, 2019.
International Search Report of International Application No. PCT/JP2018/043363 dated Feb. 19, 2019.
International Search Report of International Application No. PCT/JP2018/041893 dated Feb. 19, 2019.
International Search Report of International Application No. PCT/JP2018/041892 dated Feb. 19, 2019.
International Search Report of International Application No. PCT/JP2018/041894 dated Feb. 19, 2019.
International Search Report of International Application No. PCT/JP2018/046258 dated Feb. 5, 2019.
International Search Report of International Application No. PCT/JP2018/046259 dated Mar. 12, 2019.
International Search Report of International Application No. PCT/JP2018/046260 dated Mar. 12, 2019.
International Search Report of International Application No. PCT/JP2018/046262 dated Mar. 19, 2019.
International Search Report of International Application No. PCT/JP2018/041900 dated Feb. 19, 2019.
International Search Report of International Application No. PCT/JP2018/041897 dated Feb. 19, 2019.
International Search Report of International Application No. PCT/JP2018/046263 dated Mar. 19, 2019.
International Search Report of International Application No. PCT/JP2018/042061 dated Feb. 19, 2019.
International Search Report of International Application No. PCT/JP2018/042062 dated Feb. 19, 2019.
Yasumasa Tomita et al., "Lithium ion conductivity of Li3InBr6 doped with different element", Denka Chemical Society 70th Anniversary Conference Abstracts, Mar. 25, 2003, p. 384; with English translation.
Yasumasa Tomita et al., "Preparation of Substituted Compounds of Lithium Indium Bromide and Fabrication of All Solid-State battery", Recent Innovations in Chemical Engineering, 2017, 10, 12-17.
The Extended European Search Report dated Jan. 29, 2021 for the related European Patent Application No. 18898666.5.
The Extended European Search Report dated Feb. 5, 2021 for the related European Patent Application No. 18898795.2.
The Extended European Search Report dated Feb. 9, 2021 for the related European Patent Application No. 18898242.5.
The Extended European Search Report dated Feb. 9, 2021 for the related European Patent Application No. 18898043.7.
The Extended European Search Report dated Feb. 9, 2021 for the related European Patent Application No. 18898663.2.
The Extended European Search Report dated Feb. 9, 2021 for the related European Patent Application No. 18898873.7.
The Extended European Search Report dated Feb. 9, 2021 for the related European Patent Application No. 18898935.4.
The Extended European Search Report dated Feb. 9, 2021 for the related European Patent Application No. 18902720.4.
The Extended European Search Report dated Feb. 9, 2021 for the related European Patent Application No. 18898525.3.
The Extended European Search Report dated Feb. 10, 2021 for the related European Patent Application No. 18898462.9.
The Extended European Search Report dated Feb. 15, 2021 for the related European Patent Application No. 18898524.6.
Lutz H D et al: "Ionic motion of tetrahedrally and octahedrally coordinated lithium ions in ternary and quaternary halides", Solid State Ionics, North Holland Pub. Company. Amsterdam; NL, NL, vol. 28-30, Sep. 1, 1988? (Sep. 1, 1988), pp. 1282-1286, XP024682689.
Tetsuya Asano; Akihiro Sakai; Satoru Ouchi; Masashi Sakaida; Akinobu Miyazaki; Shinya Hasegawa: "Solid Halide Electrolytes with High Lithium-Ion Conductivity for Application in 4 V Class Bulk-Type All-Solid-State Batteries", Advanced Materials, vol. 30, No. 44, Sep. 14, 2018? (Sep. 14, 2018), p. 1803075, XP055721991.
International Search Report of International Application No. PCT/JP2018/046264 dated Mar. 19, 2019.
International Search Report of International Application No. PCT/JP2018/045588 dated Mar. 19, 2019.
International Search Report of International Application No. PCT/JP2018/042060 dated Jan. 29, 2019.
International Search Report of International Application No. PCT/JP2019/040062 dated Dec. 24, 2019.
International Search Report of International Application No. PCT/JP2019/040063 dated Dec. 24, 2019.
The Extended European Search Report dated Feb. 11, 2021 for the related European Patent Application No. 18902871.5.
The Extended European Search Report dated Feb. 17, 2021 for the related European Patent Application No. 18902279.1.
The Extended European Search Report dated Dec. 20, 2021 for the related European Patent Application No. 19891097.8.
English Translation of Chinese Search Report dated Jul. 6, 2021 for the related Chinese Patent Application No. 201880071236.0.
English Translation of Chinese Search Report dated Jul. 30, 2021 for the related Chinese Patent Application No. 201880071076.X.
English Translation of Chinese Search Report dated Aug. 2, 2021 for the related Chinese Patent Application No. 201880070620.9.
Indian Examination Report dated Apr. 4, 2022 for the related Indian Patent Application No. 202047027797.
Indian Examination Report dated Apr. 4, 2022 for the related Indian Patent Application No. 202047027476.
Indian Examination Report dated Apr. 29, 2022 for the related Indian Patent Application No. 202047027475.
Indian Examination Report dated May 25, 2022 for the related Indian Patent Application No. 202047027723.
Indian Examination Report dated Jun. 13, 2022 for the related Indian Patent Application No. 202047027726.
Indian Examination Report dated Jun. 14, 2022 for the related Indian Patent Application No. 202047027488.
Tomita, Y. et al., "Substitution effect of ionic conductivity in lithium ion conductor, Li3InBr6—xClx.," Solid State Ionics 179.21-26 (2008): 867-870 (Year: 2008).
Steiner, H.-J., and H. D. Lutz, "Neue schnelle Ionenleiter vom Typ MI3 MIIICl6 (MI = Li, Na, Ag; MIII= In, Y)." Zeitschrift für anorganische und allgemeine Chemie 613.7 (1992): 26-30 (Year: 1992).

POSITIVE ELECTRODE MATERIAL AND BATTERY USING SAME

BACKGROUND

1. Technical Field

The present disclosure relates to a positive electrode material and a battery using the positive electrode material.

2. Description of the Related Art

Patent Literature 1 discloses an all-solid battery including a solid electrolyte formed of a halide including indium.

CITATION LIST

Patent Literature

Patent Literature 1: Japanese Patent Application Publication No. 2006-244734

SUMMARY

An object of the present disclosure is to improve charge/discharge efficiency of a battery.

The present disclosure provides a positive electrode material comprising:
a positive electrode active material; and
a first solid electrolyte material,
wherein
the first solid electrolyte material includes Li, M, and X, and does not include sulfur;
M is at least one selected from the group consisting of metalloid elements and metal elements other than Li;
X is at least one selected from the group consisting of Cl, Br, and I; and
the positive electrode active material includes a metal oxyfluoride.

The present disclosure improves the charge/discharge efficiency of the battery.

DETAILED DESCRIPTION OF THE EMBODIMENTS

Figure 1:
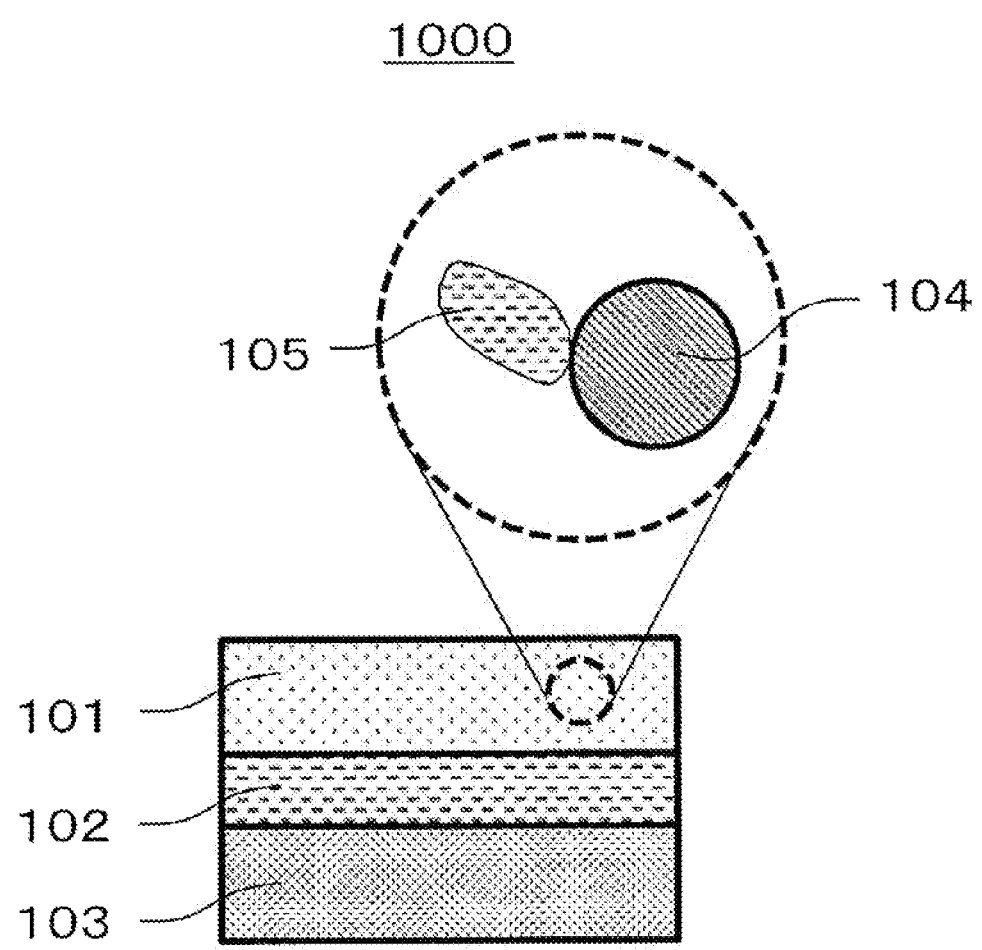
FIG. 1 shows a cross-sectional view of a battery 1000 in a second embodiment.

Hereinafter, embodiments of the present disclosure will be described with reference to the drawings.

First Embodiment

The positive electrode material in the first embodiment includes a positive electrode active material and a first solid electrolyte material.

The first solid electrolyte material is a material represented by the following composition formula (1).

$$Li_\alpha M_\beta X_\gamma \quad (1)$$

where
$\alpha$, $\beta$, and $\gamma$ are each independently a value greater than 0;
M includes at least one selected from the group consisting of metalloid elements and metal elements other than Li; and
X is at least one selected from the group consisting of Cl, Br, and I.

The positive electrode active material includes a metal oxyfluoride.

According to the above configuration, charge/discharge efficiency of a battery can be improved.

In the metal oxyfluoride, a part of oxygen atoms is substituted with an electrochemically inert fluorine atom. The substitution improves the electrochemical stability, and as a result, the charge/discharge efficiency is improved.

The first solid electrolyte material included in the positive electrode material is formed of a halide solid electrolyte. The halide solid electrolyte improves the charge/discharge efficiency. This is because, even if the first solid electrolyte material is fluorinated at the contact surface between the positive electrode active material and the first solid electrolyte material, a resistance layer is not formed.

The term "metalloid element" used in the present specification means at least one selected from the group consisting of B, Si, Ge, As, Sb, and Te.

The term "metal element" used in the present specification includes:

(i) all elements included in Group 1 to Group 12 of the periodic table (except hydrogen); and (ii) all elements included in Group 13 to Group 16 of the periodic table (except for B, Si, Ge, As, Sb, Te, C, N, P, O, S, and Se).

In other words, each of the metal elements become a cation, if the metal elements form an inorganic compound with a halogen compound.

In the composition formula (1), M may include Y (namely, yttrium). In other words, the first solid electrolyte material may include Y as the metal element M.

According to the above configuration, the ionic conductivity of the first solid electrolyte material can be further improved. Thereby, the charge/discharge efficiency of the battery can be further improved.

An example of the first solid electrolyte material including Y is a compound represented by the composition formula $Li_a Me_b Y_c X_6$ (where a+mb+3c=6, c>0, Me is at least one selected from the group consisting of metalloid elements and metal elements other than Li and Y, and m is a valence of Me).

An example of Me is at least one selected from the group consisting of Mg, Ca, Sr, Ba, Zn, Sc, Al, Ga, Bi, Zr, Hf, Ti, Sn, Ta, and Nb.

According to the above configuration, the ionic conductivity of the first solid electrolyte material can be further improved.

An example of the first solid electrolyte material is $Li_3YCl_6$, $Li_3YBr_6$, $Li_3Y_{0.5}Zr_{0.5}Cl_6$, or $Li_3YBr_2Cl_2I_2$.

According to the above configuration, the ionic conductivity of the first solid electrolyte material can be further improved.

The first solid electrolyte material may be a material represented by the following composition formula (A1):

$$Li_{6-3d} Y_d X_6 \quad \text{Formula (A1)}$$

where X is two or more kinds of elements selected from the group consisting of Cl, Br, and I.

In the composition formula (A1), 0<d<2 is satisfied.

According to the above configuration, the ionic conductivity of the first solid electrolyte material can be further improved. Thereby, the charge/discharge efficiency of the battery can be further improved.

The first solid electrolyte material may be a material represented by the following composition formula (A2):

$$Li_3YX_6 \quad \text{Formula (A2)}$$

where X is two or more kinds of elements selected from the group consisting of Cl, Br, and I.

In other words, in A1, d=1 may be satisfied.

According to the above configuration, the ionic conductivity of the first solid electrolyte material can be further improved. Thereby, the charge/discharge efficiency of the battery can be further improved.

The first solid electrolyte material may be a material represented by the following composition formula (A3):

$$Li_{3-3\delta}Y_{1+\delta}Cl_6 \quad \text{Formula (A3)}$$

where $0<\delta\leq0.15$.

According to the above configuration, the ionic conductivity of the first solid electrolyte material can be further improved. Thereby, the charge/discharge efficiency of the battery can be further improved.

The first solid electrolyte material may be a material represented by the following composition formula (A4):

$$Li_{3-3\delta}Y_{1+\delta}Br_6 \quad \text{Formula (A4)}$$

where $0<\delta\leq0.25$.

According to the above configuration, the ionic conductivity of the first solid electrolyte material can be further improved. Thereby, the charge/discharge efficiency of the battery can be further improved.

The first solid electrolyte material may be a material represented by the following composition formula (A5):

$$Li_{3+3\delta+a}Y_{1+\delta-a}Me_aCl_{6-x-y}Br_xI_y \quad \text{Formula (A5)}$$

where

Me is at least one selected from the group consisting of Mg, Ca, Sr, Ba, and Zn.

In the composition formula (A5), $-1<\delta<2$;

$0<a<3$;

$0<(3-3\delta+a)$;

$0<(1+\delta-a)$;

$0\leq x\leq6$;

$0\leq y\leq6$; and $(x+y)\leq6$ are satisfied.

According to the above configuration, the ionic conductivity of the first solid electrolyte material can be further improved. Thereby, the charge/discharge efficiency of the battery can be further improved.

The first solid electrolyte material may be a material represented by the following composition formula (A6):

$$Li_{3-3\delta}Y_{1+\delta-a}Me_aCl_{6-x-y}Br_xI_y \quad \text{Formula (A6)}$$

where

Me is at least one selected from the group consisting of Al, Sc, Ga, and Bi.

In the composition formula (A6), $-1<\delta<1$;

$0<a<2$;

$0<(1+\delta-a)$;

$0\leq x\leq6$;

$0\leq y\leq6$; and $(x+y)\leq6$ are satisfied.

According to the above configuration, the ionic conductivity of the first solid electrolyte material can be further improved. Thereby, the charge/discharge efficiency of the battery can be further improved.

The first solid electrolyte material may be a material represented by the following composition formula (A7):

$$Li_{3-3\delta-a}Y_{1+\delta}Me_aCl_{6-x-y}Br_xI_y \quad \text{Formula (A7)}$$

where Me is at least one selected from the group consisting of Zr, Hf, and Ti.

In the composition formula (A7), $-1<\delta<1$;

$0<a<1.5$;

$0<(3-3\delta-a)$;

$0<(1+\delta-a)$;

$0\leq x\leq6$;

$0\leq y\leq6$; and $(x+y)\leq6$ are satisfied.

According to the above configuration, the ionic conductivity of the first solid electrolyte material can be further improved. Thereby, the charge/discharge efficiency of the battery can be further improved.

The first solid electrolyte material may be a material represented by the following composition formula (A8):

$$Li_{3-3\delta-2a}Y_{1+\delta-a}Me_aCl_{6-x-y}Br_xI_y \quad \text{Formula (A8)}$$

where Me is at least one selected from the group consisting of Ta and Nb.

In the composition formula (A8), $-1<\delta<1$;

$0<a<1.2$;

$0<(3-3\delta-2a)$;

$0<(1+\delta-a)$;

$0\leq x\leq6$;

$0\leq y\leq6$; and $(x+y)\leq6$ are satisfied.

According to the above configuration, the ionic conductivity of the first solid electrolyte material can be further improved. Thereby, the charge/discharge efficiency of the battery can be further improved.

As the first solid electrolyte material, for example, $Li_3YX_6$, $Li_2MgX_4$, $Li_2FeX_4$, $Li(Al, Ga, In)X_4$, or $Li_3(Al, Ga, In)X_6$ may be used.

The metal oxyfluoride may be a material represented by the following composition formula (2):

$$Li_pMe_qO_mF_n \quad \text{Formula (2)}$$

where

Me is at least one selected from the group consisting of Mn, Co, Ni, Fe, Al, Cu, V, Nb, Mo, Ti, Cr, Zr, Zn, Na, K, Ca, Mg, Pt, Au, Ag, Ru, W, B, Si, and P.

In the composition formula (2), $0.5 \leq p \leq 1.5$;

$0.5 \leq q \leq 1.0$;

$1 \leq m < 2$; and $0 < n \leq 1$ are satisfied.

According to the above configuration, the charge/discharge efficiency of the battery can be further improved.

An example of the metal oxyfluoride is $Li_{1.05}(Ni_{0.35}Co_{0.35}Mn_{0.3})_{0.95}O_{1.9}F_{0.1}$.

According to the above configuration, the charge/discharge efficiency of the battery can be further improved.

The positive electrode material in the first embodiment may include positive electrode active material particles 104 and first solid electrolyte particles 105, as shown in FIG. 1.

In the first embodiment, the shape of the first solid electrolyte particles 105 is not limited. The shape of the first solid electrolyte particles 105 is, for example, acicular-shape, spherical-shape, or elliptically spherical-shape. For example, the shape of each of the first solid electrolyte particles 105 may be particulate.

For example, if the shape of each of the first solid electrolyte particles 105 in the first embodiment is particulate (for example, spherical), the median diameter of the first solid electrolyte particles 105 may be not more than 100 μm.

If the median diameter of the first solid electrolyte particles 105 is more than 100 μm, the positive electrode active material particles 104 and the first solid electrolyte particles 105 are not well dispersed in the positive electrode, so that the charge/discharge characteristic of the battery may be lowered.

In the first embodiment, the median diameter of the first solid electrolyte particles 105 may be not more than 10 μm.

According to the above configuration, the positive electrode active material particles 104 and the first solid electrolyte particles 105 can be dispersed well in the positive electrode material.

In the first embodiment, the median diameter of the first solid electrolyte particles 105 may be smaller than the median diameter of the positive electrode active material particles 104.

According to the above configuration, the first solid electrolyte particles 105 and the positive electrode active material particles 104 can be further dispersed well in the electrode.

The median diameter of the positive electrode active material particles 104 may be not less than 0.1 μm and not more than 100 μm.

If the median diameter of the positive electrode active material particles 104 is less than 0.1 μm, the positive electrode active material particles 104 and the first solid electrolyte particles 105 are not well dispersed in the positive electrode, so that the charge/discharge characteristic of the battery may be lowered.

If the median diameter of the positive electrode active material particles 104 is more than 100 μm, the diffusion rate of lithium in the positive electrode active material particles 104 may be decreased. As a result, it may be difficult to operate the battery at a high output.

The median diameter of the positive electrode active material particles 104 may be larger than the median diameter of the first solid electrolyte particles 105. Thereby, the positive electrode active material particles 104 and the first solid electrolyte particles 105 can be dispersed well.

In the positive electrode material in the first embodiment, the first solid electrolyte particles 105 and the positive electrode active material particles 104 may be in contact with each other, as shown in FIG. 1.

The positive electrode material in the first embodiment may include a plurality of the first solid electrolyte particles 105 and a plurality of the positive electrode active material particles 104.

In the positive electrode material in the first embodiment, the content of the first solid electrolyte particles 105 may be the same as or different from the content of the positive electrode active material particles 104.

(Fabrication Method of First Solid Electrolyte Material)

The first solid electrolyte material in the first embodiment is fabricated, for example, by the following method.

In consideration of the composition ratio of the product, raw material powders of binary halides are prepared. For example, for the synthesis of $Li_3YCl_6$, LiCl and $YCl_3$ are prepared at a molar ratio of 3:1.

By selecting the kinds of the raw material powders, the elements "M", "Me", and "X" in the above composition formulas are determined. By adjusting the raw material powders, the blending ratio, and the synthesis process, the values of "α", "β", "γ", "d", "δ", "a", "x", and "y" are determined.

The raw material powders are mixed well. Next, the raw material powders are ground by a mechanochemical milling method. In this way, the raw material powders react to provide the first solid electrolyte material. Alternatively, the raw material powders may be mixed well, and then, sintered in vacuum to provide the first solid electrolyte material.

Thereby, the above-described first solid electrolyte material including a crystal phase is provided.

The configuration of the crystal phase (namely, the crystal structure) in the first solid electrolyte material may be determined by selecting the reaction method and reaction conditions of the raw material powders.

Second Embodiment

Hereinafter, the second embodiment of the present disclosure will be described. The description which has been set forth in the first embodiment is omitted as appropriate.

FIG. 1 shows a cross-sectional view of a battery 1000 according to the second embodiment.

The battery 1000 according to the second embodiment comprises a positive electrode 101, an electrolyte layer 102, and a negative electrode 103.

The electrolyte layer 102 is disposed between the positive electrode 101 and the negative electrode 103.

The positive electrode 101 includes the positive electrode material in the first embodiment.

According to the above configuration, the charge/discharge efficiency of the battery can be improved.

In the metal oxyfluoride, a part of the oxygen atom is substituted with an electrochemically inert fluorine atom. This substitution would improve electrochemical stability and charge/discharge efficiency.

Furthermore, by using the halide solid electrolyte as the first solid electrolyte included in the positive electrode material, the resistance layer is not formed, even if the solid electrolyte is fluorinated at the contact surface between the positive electrode and the solid electrolyte. For this reason, the charge/discharge efficiency is improved.

In the positive electrode 101, a volume ratio Vp representing a volume of the positive electrode active material particles 104 to the total volume of the positive electrode active material particles 104 and the first solid electrolyte particles 105 may be not less than 0.3 and not more than 0.95. If the volume ratio Vp is less than 0.3, it may be difficult to ensure an energy density of the battery sufficiently. On the other hand, if the volume ratio Vp is more than 0.95, it may be difficult to operate the battery at a high output.

The thickness of the positive electrode 101 may be not less than 10 µm and not more than 500 µm. If the thickness of the positive electrode 101 is less than 10 µm, it may be difficult to ensure an energy density of the battery sufficiently. On the other hand, if the thickness of the positive electrode 101 is more than 500 µm, it may be difficult to operate at a high output.

The electrolyte layer 102 includes an electrolyte material. An example of the electrolyte material included in the electrolyte layer 102 is a solid electrolyte material. In other words, the electrolyte layer 102 may be a solid electrolyte layer.

An example of the solid electrolyte material included in the electrolyte layer 102 is the first solid electrolyte material described above.

According to the above configuration, output density of the battery can be further improved.

An example of the solid electrolyte material included in the electrolyte layer 102 is a sulfide solid electrolyte.

According to the above configuration, since the sulfide solid electrolyte excellent in reduction stability is included, a low potential negative electrode material such as graphite or metallic lithium can be used, and the energy density of the battery can be improved.

An example of the material of the sulfide solid electrolyte is $Li_2S-P_2S_5$, $Li_2S-SiS_2$, $Li_2S-B_2S_3$, $Li_2S-GeS_2$, $Li_{3.25}Ge_{0.25}P_{0.75}S_4$, or $Li_{10}GeP_2S_{12}$. LiX (X:F, Cl, Br, or I), $Li_2O$, $MO_q$, or $Li_pMO_q$ (M is any of P, Si, Ge, B, Al, Ga, In, Fe, or Zn, and p and q are each independently a natural number) may be added to the sulfide solid electrolyte.

Still another example of the solid electrolyte material included in the electrolyte layer 102 is an oxide solid electrolyte, a polymer solid electrolyte, or a complex hydride solid electrolyte.

An example of the oxide solid electrolyte is:

(i) a NASICON solid electrolyte such as $LiTi_2(PO_4)_3$ or its element substitution product;

(ii) a $(LaLi)TiO_3$ perovskite solid electrolyte;

(iii) a LISICON solid electrolyte such as $Li_{14}ZnGe_4O_{16}$, $Li_4SiO_4$, or $LiGeO_4$ or its element substitution product;

(iv) a garnet solid electrolyte such as $Li_7La_3Zr_2O_{12}$ or its element substitution product;

(v) $Li_3N$ and its H substitution product;

(vi) $Li_3PO_4$ and its N substitution product;

(vii) glass which is formed of a Li—B—O compound such as $LiBO_2$ or $Li_3BO_3$ as a main component and to which an additive such as $Li_2SO_4$ or $Li_2CO_3$ is added; or (viii) glass ceramics.

An example of the polymer solid electrolyte is a polymer compound and a lithium salt compound. The polymer compound may have an ethylene oxide structure. Since the polymer solid electrolyte having an ethylene oxide structure can contain a large amount of lithium salt, the ionic conductivity can be further increased. An example of the lithium salts is $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$. Two or more kinds of the lithium salts may be used.

An example of the complex hydride solid electrolyte is $LiBH_4—LiI$ or $LiBH_4—P_2S_5$.

The electrolyte layer 102 may include a solid electrolyte material as a main component. A weight ratio of the solid electrolyte material included in the electrolyte layer 102 to the electrolyte layer 102 may be not less than 0.5.

According to the above configuration, the charge/discharge characteristic of the battery can be further improved.

The weight ratio of the solid electrolyte material included in the electrolyte layer 102 to the electrolyte layer 102 may be not less than 0.7.

According to the above configuration, the charge/discharge characteristic of the battery can be further improved.

The electrolyte layer 102 may further include inevitable impurities. The electrolyte layer 102 can include the starting materials used for the synthesis of the solid electrolyte material. The electrolyte layer 102 may include by-products or decomposition products generated when the solid electrolyte material is synthesized.

The weight ratio of the solid electrolyte material included in the electrolyte layer 102 to the electrolyte layer 102 may be substantially 1. "The weight ratio is substantially 1" means that the weight ratio calculated without considering the inevitable impurities that may be included in the electrolyte layer 102 is 1. In other words, the electrolyte layer 102 may be composed only of the solid electrolyte material.

According to the above configuration, the charge/discharge characteristic of the battery can be further improved.

As described above, the electrolyte layer 102 may be composed only of the solid electrolyte material.

The electrolyte layer 102 can include two or more kinds of solid electrolyte materials. For example, the electrolyte layer 102 may include a first solid electrolyte material and a sulfide solid electrolyte material.

The thickness of the electrolyte layer 102 may be not less than 1 µm and not more than 300 µm. If the thickness of the electrolyte layer 102 is less than 1 µm, the positive electrode 101 and the negative electrode 103 may be short-circuited. On the other hand, if the thickness of the electrolyte layer 102 is more than 300 µm, it may be difficult to operate at a high output.

The negative electrode 103 includes a material having a property of storing and releasing metal ions (for example, lithium ions). The negative electrode 103 may include a negative electrode active material.

An example of the negative electrode active material is a metal material, a carbon material, an oxide, a nitride, a tin compound, or a silicon compound. The metal material may be a single metal. Alternatively, the metal material may be an alloy. An example of the metal material is lithium metal or a lithium alloy. An example of the carbon material is natural graphite, coke, graphitized carbon, carbon fibers, spherical carbon, artificial graphite, or amorphous carbon. From the viewpoint of capacity density, it is desirable that the negative electrode active material is silicon, tin, a silicon compound, or a tin compound.

The negative electrode 103 may include a solid electrolyte material. According to the above configuration, the lithium ion conductivity inside the negative electrode 103 is increased to allow the operation at a high output. The solid electrolyte material included in the negative electrode 103 may be the same as the solid electrolyte material included in the electrolyte layer 102.

The median diameter of the negative electrode active material particles may be not less than 0.1 μm and not more than 100 μm. If the median diameter of the negative electrode active material particles is less than 0.1 μm, the negative electrode active material particles and the solid electrolyte material are not well dispersed in the negative electrode, so that the charge/discharge characteristic of the battery can be lowered. If the median diameter of the negative electrode active material particles is more than 100 μm, the diffusion rate of lithium in the negative electrode active material particles may be decreased. As a result, it may be difficult to operate the battery at a high output.

The median diameter of the negative electrode active material particles may be larger than the median diameter of the solid electrolyte material. Thereby, the negative electrode active material particles and the solid electrolyte material can be dispersed well.

In the negative electrode 103, a volume ratio Vn representing a volume of the negative electrode active material particles to the total volume of the negative electrode active material particles and the solid electrolyte material may be not less than 0.3 and not more than 0.95. If the volume ratio Vn is less than 0.3, it may be difficult to ensure an energy density of the battery sufficiently. On the other hand, if the volume ratio Vn is more than 0.95, it may be difficult to operate the battery at a high output.

The thickness of the negative electrode 103 may be not less than 10 μm and not more than 500 μm. If the thickness of the negative electrode is less than 10 μm, it may be difficult to ensure an energy density of the battery sufficiently. On the other hand, if the thickness of the negative electrode is more than 500 μm, it may be difficult to operate at a high output.

At least one selected from the group consisting of the positive electrode 101, the electrolyte layer 102, and the negative electrode 103 may include a binder for the purpose of improving adhesion between the particles. The binder is used in order to improve the binding property of the material included in the electrode.

An example of the material of the binder is poly(vinylidene fluoride), polytetrafluoroethylene, polyethylene, polypropylene, aramid resin, polyamide, polyimide, polyamideimide, polyacrylonitrile, polyacrylic acid, methyl polyacrylate ester, ethyl polyacrylate ester, hexyl polyacrylate ester, polymethacrylic acid, methyl polymethacrylate ester, ethyl polymethacrylate ester, hexyl polymethacrylate ester, polyvinyl acetate, polyvinylpyrrolidone, polyether, polyethersulfone, hexafluoropolypropylene, styrene butadiene rubber, or carboxymethylcellulose.

Another example of the material of the binder is a copolymer of two or more kinds of materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene.

Two or more kinds of the binders may be used.

At least one selected from the group consisting of the positive electrode 101 and the negative electrode 103 may include a conductive agent for the purpose of increasing the electronic conductivity. An example of the conductive agent is (i) graphite such as natural graphite or artificial graphite;
(ii) carbon black such as acetylene black or ketjen black;
(iii) a conductive fiber such as a carbon fiber or a metal fiber;
(iv) carbon fluoride;
(v) a metal powder such as aluminum;
(vi) conductive whiskers such as zinc oxide or potassium titanate;
(vii) a conductive metal oxide such as titanium oxide; or
(viii) a conductive polymer compound such as polyaniline, polypyrrole, or polythiophene.

Cost reduction can be achieved by using a carbon conductive agent.

An example of the shape of the battery in the second embodiment is a coin, a cylinder, a prism, a sheet, a button, a flat type, or a stacked structure.

EXAMPLES

The present disclosure will be described in more detail with reference to the following inventive examples and comparative examples.

Inventive Example 1

(Production of First Solid Electrolyte Material)

In an argon glove box having a dew point of not more than minus 60 degrees Celsius, a mixture of LiCl raw material powder and $YCl_3$ raw material powder was prepared so as to have a molar ratio of $LiCl:YCl_3=3:2$. Subsequently, the mixture was milled at 600 rpm for 25 hours using a planetary ball mill (manufactured by Fritsch, P-7 type) to provide a powder of a first solid electrolyte material $Li_3YCl_6$ according to the inventive example 1.

(Production of Metal Oxyfluoride Positive electrode Active Material)

In an argon glove box having a dew point of not more than minus 60 degrees Celsius, a mixture of $LiNiO_2$ raw material powder, $LiCoO_2$ raw material powder, $LiMnO_2$ raw material powder, and LiF raw material powder was prepared so as to have a molar ratio of $LiNiO_2:LiCoO_2:LiMnO_2:LiF=33.25:33.25:28.5:10$. The mixture was put in a container with balls each having a diameter of 5 millimeters. The balls were formed of zirconia. The container was also formed of zirconia. The container had a capacity of 45 milliliters. The mixture was sealed in the argon glove box. The mixture was milled at 600 rpm for 35 hours to provide a compound. The provided compound was sintered in air at a temperature of 700 degrees Celsius for 1 hour. In this way, a metal oxyfluoride positive electrode active material $Li_{1.05}(Ni_{0.35}Co_{0.35}Mn_{0.3})_{0.95}O_{1.9}F_{0.1}$ according to the inventive example 1 was provided.

(Production of Positive Electrode Material)

In an argon glove box, the metal oxyfluoride positive electrode active material according to the inventive example 1 and the first solid electrolyte material according to the inventive example 1 were prepared at a weight ratio of 70:30. The metal oxyfluoride positive electrode active material and the first solid electrolyte material were mixed in an agate mortar to produce a positive electrode material according to the inventive example 1.

(Production of Secondary Battery)

In an insulating outer cylinder, the positive electrode material according to the inventive example 1 (10 milligrams) and the first solid electrolyte material according to the inventive example 1 (80 milligrams) were stacked in this order. Next, a pressure of 360 MPa was applied to these positive electrode material and first solid electrolyte material to produce a stacking structure having a positive electrode on the front side of a solid electrolyte layer.

Next, a metal In layer having a thickness of 200 micrometers, a metal Li layer having a thickness of 300 micrometers, and a metal In layer having a thickness of 200 micrometers were stacked in this order on the back side of the solid electrolyte layer. A pressure of 80 MPa was applied to these three metal layers to produce a stacking structure having the positive electrode, the solid electrolyte layer, and a negative electrode.

Stainless steel current collectors were disposed on the positive electrode and the negative electrode, and current collector leads were provided on the current collectors.

Finally, an insulating ferrule was used to block and seal the inside of the insulating outer cylinder from the outside atmosphere. In this way, a secondary battery according to the inventive example 1 was produced.

Inventive Example 2

(Production of First Solid Electrolyte Material)

In an argon glove box having a dew point of not more than minus 60 degrees Celsius, a mixture of LiBr raw material powder and YBr$_3$ raw material powder was prepared so as to have a molar ratio of LiBr:YBr$_3$=3:2. Subsequently, the mixture was milled at 600 rpm for 25 hours using a planetary ball mill (manufactured by Fritsch, P-7 type) to provide a powder of a first solid electrolyte material Li$_3$YBr$_6$ according to the inventive example 2.

Next, a secondary battery according to the inventive example 2 was produced in the same way as in the inventive example 1, except that the first solid electrolyte material according to the inventive example 2 was used for the positive electrode in place of the first solid electrolyte material according to the inventive example 1.

Inventive Example 3

(Production of First Solid Electrolyte Material)

In an argon glove box having a dew point of not more than minus 60 degrees Celsius, a mixture of LiCl raw material powder, YCl$_3$ raw material powder, and ZrCl$_4$ raw material powder was prepared so as to have a molar ratio of LiCl:YCl$_3$:ZrCl$_4$=2.5:0.5:0.5. Subsequently, the mixture was milled at 600 rpm for 25 hours using a planetary ball mill (manufactured by Fritsch, P-7 type) to provide a powder of a first solid electrolyte material Li$_{2.5}$Y$_{0.5}$Zr$_{0.5}$Cl$_6$ according to the inventive example 3.

Next, a secondary battery according to the inventive example 3 was produced in the same way as in the inventive example 1, except that the first solid electrolyte material according to the inventive example 3 was used for the positive electrode in place of the first solid electrolyte material according to the inventive example 1.

Inventive Example 4

(Production of First Solid Electrolyte Material)

In an argon glove box having a dew point of not more than minus 60 degrees Celsius, a mixture of LiBr raw material powder, LiCl raw material powder, LiI raw material powder, YCl$_3$ raw material powder, and YBr$_3$ raw material powder was prepared so as to have a molar ratio of LiBr:LiCl:LiI:YCl$_3$:YBr$_3$=1:1:4:1:1. Subsequently, the mixture was milled at 600 rpm for 25 hours using a planetary ball mill (manufactured by Fritsch, P-7 type) to provide a powder of a first solid electrolyte material Li$_3$YBr$_2$Cl$_2$I$_2$ according to the inventive example 4.

Next, a secondary battery according to the inventive example 4 was produced in the same way as in the inventive example 1, except that the first solid electrolyte material according to the inventive example 4 was used for the positive electrode in place of the first solid electrolyte material according to the inventive example 1.

Comparative Example 1

(Production of Positive Electrode Active Material)

In an argon glove box having a dew point of not more than minus 60 degrees Celsius, a mixture of LiNiO$_2$ raw material powder, LiCoO$_2$ raw material powder, LiMnO$_2$ raw material powder, and LiF raw material powder was prepared so as to have a molar ratio of LiNiO$_2$:LiCoO$_2$:LiMnO$_2$=33.25:33.25:28.5. The mixture was put in a container with balls each formed of zirconia and having a diameter of 5 millimeters. The container was formed of zirconia. The container formed of zirconia had a capacity of 45 milliliters. The mixture was sealed in the argon glove box. The mixture was milled at 600 rpm for 35 hours to provide a compound. The provided compound was sintered at 700 degrees Celsius for 1 hour in air. In this way, a positive electrode active material Li$_{1.05}$(Ni$_{0.35}$Co$_{0.35}$Mn$_{0.3}$)$_{0.95}$O$_2$ according to the comparative example 1 was provided.

(Production of Positive Electrode Material)

In the argon glove box, the positive electrode active material according to the comparative example 1 and the first solid electrolyte material according to the inventive example 1 were prepared at a weight ratio of 70:30. The positive electrode active material and the first solid electrolyte material were mixed in an agate mortar to produce a positive electrode material according to the comparative example 1.

Next, a secondary battery according to the comparative example 1 was produced in the same way as in the inventive example 1, except that the positive electrode material according to the comparative example 1 was used for the positive electrode in place of the positive electrode material according to the inventive example 1.

Comparative Example 2

(Production of Positive Electrode Material)

In the argon glove box, the positive electrode active material according to the comparative example 1 and the first solid electrolyte material according to the inventive example 2 were prepared at a weight ratio of 70:30. The positive electrode active material and the first solid electrolyte material were mixed in an agate mortar to produce a positive electrode material according to the comparative example 2.

Next, a secondary battery according to the comparative example 2 was produced in the same way as in the inventive example 1, except that the positive electrode material according to the comparative example 2 was used for the positive electrode in place of the positive electrode material according to the inventive example 1.

Comparative Example 3

(Production of Positive Electrode Material)

In the argon glove box, the positive electrode active material according to the comparative example 1 and the first solid electrolyte material according to the inventive example 3 were prepared at a weight ratio of 70:30. The positive electrode active material and the first solid electrolyte material were mixed in an agate mortar to produce a positive electrode material according to the comparative example 3.

Next, a secondary battery according to the comparative example 3 was produced in the same way as in the inventive example 1, except that the positive electrode material according to the comparative example 3 was used for the positive electrode in place of the positive electrode material according to the inventive example 1.

Comparative Example 4

(Production of Positive Electrode Material)

In the argon glove box, the positive electrode active material according to the comparative example 1 and the first solid electrolyte material according to the inventive example 4 were prepared at a weight ratio of 70:30. The positive electrode active material and the first solid electrolyte material were mixed in an agate mortar to produce a positive electrode material according to the comparative example 4.

Next, a secondary battery according to the comparative example 4 was produced in the same way as in the inventive example 1, except that the positive electrode material according to the comparative example 4 was used for the positive electrode in place of the positive electrode material according to the inventive example 1.

Comparative Example 5

(Production of Sulfide Solid Electrolyte Material)

In an argon glove box filled with an Ar gas and having a dew point of not more than minus 60 degrees Celsius, a mixture of $Li_2S$ raw material powder and $P_2S_5$ raw material powder was prepared at a molar ration of $Li_2S:P_2S_5=75:25$. The mixture was ground in a mortar. Subsequently, the mixture was milled at 510 rpm for 10 hours using a planetary ball mill (manufactured by Fritsch, P-7 type) to provide a glassy solid electrolyte material. The glassy solid electrolyte material was subjected to heat treatment at 270 degrees Celsius for 2 hours in an inert atmosphere. As a result, a sulfide solid electrolyte material $Li_2S$—$P_2S_5$ was provided.

(Production of Positive Electrode Material)

In the argon glove box, the positive electrode active material according to the comparative example 1 and the sulfide solid electrolyte material according to the comparative example 5 were prepared at a weight ratio of 70:30. The positive electrode active material and the sulfide solid electrolyte material were mixed in an agate mortar to produce a positive electrode material according to the comparative example 5.

Next, a secondary battery according to the comparative example 5 was produced in the same way as in the inventive example 1, except that the positive electrode material according to the comparative example 5 was used for the positive electrode in place of the positive electrode material according to the inventive example 1.

Comparative Example 6

[Production of Positive Electrode Material]

In the argon glove box, the metal oxyfluoride positive electrode active material according to the inventive example 1 and the sulfide solid electrolyte material according to the comparative example 5 were prepared at a weight ratio of 70:30. The metal oxyfluoride positive electrode active material and the sulfide solid electrolyte material were mixed in an agate mortar to produce a positive electrode material according to the comparative example 6.

Next, a secondary battery according to the comparative example 6 was produced in the same way as in the inventive example 1, except that the positive electrode material according to the comparative example 6 was used for the positive electrode in place of the positive electrode material according to the inventive example 1.

(Charge/Discharge Test)

Each of the batteries of the inventive examples 1 to 4 and the comparative examples 1 to 6 was subjected to the following charge/discharge test.

The battery was placed inside a thermostatic chamber maintained at 25 degrees Celsius.

The battery was charged at a constant current of 70 microamperes. The charge was terminated at the time when the potential with respect to Li reached 4.9 V.

Next, the battery was discharged at a current value of 70 microamperes. The discharge was terminated at the time when the potential with respect to Li reached 2.5 V.

On the basis of the results of the charge and the discharge, the initial charge/discharge efficiency (=initial discharge capacity/initial charge capacity) of each of the batteries of the inventive examples 1 to 4 and the comparative examples 1 to 6 was calculated. The following Table 1 shows the calculation results.

TABLE 1

| | Positive electrode Active Material | Solid Electrolyte | Charge/Discharge Efficiency % |
|---|---|---|---|
| Inventive Example 1 | $Li_{1.05}(Ni_{0.35}Co_{0.35}Mn_{0.3})_{0.95}O_{1.9}F_{0.1}$ | $Li_3YCl_6$ | 75.4 |
| Inventive Example 2 | $Li_{1.05}(Ni_{0.35}Co_{0.35}Mn_{0.3})_{0.95}O_{1.9}F_{0.1}$ | $Li_3YBr_6$ | 78.7 |
| Inventive Example 3 | $Li_{1.05}(Ni_{0.35}Co_{0.35}Mn_{0.3})_{0.95}O_{1.9}F_{0.1}$ | $Li_{2.5}Y_{0.5}Zr_{0.5}Cl_6$ | 80.1 |
| Inventive Example 4 | $Li_{1.05}(Ni_{0.35}Co_{0.35}Mn_{0.3})_{0.95}O_{1.9}F_{0.1}$ | $Li_3YBr_2Cl_2I_2$ | 81.6 |
| Comparative Example 1 | $Li_{1.05}(Ni_{0.35}Co_{0.35}Mn_{0.3})_{0.95}O_2$ | $Li_3YCl_6$ | 61.7 |
| Comparative Example 2 | $Li_{1.05}(Ni_{0.35}Co_{0.35}Mn_{0.3})_{0.95}O_2$ | $Li_3YBr_6$ | 69.3 |
| Comparative Example 3 | $Li_{1.05}(Ni_{0.35}Co_{0.35}Mn_{0.3})_{0.95}O_2$ | $Li_{2.5}Y_{0.5}Zr_{0.5}Cl_6$ | 64.2 |
| Comparative Example 4 | $Li_{1.05}(Ni_{0.35}Co_{0.35}Mn_{0.3})_{0.95}O_2$ | $Li_3YBr_2Cl_2I_2$ | 0.0 |

TABLE 1-continued

| | Positive electrode Active Material | Solid Electrolyte | Charge/Discharge Efficiency % |
|---|---|---|---|
| Comparative Example 5 | $Li_{1.05}(Ni_{0.35}Co_{0.35}Mn_{0.3})_{0.95}O_2$ | $Li_2S-P_2S_5$ | 59.8 |
| Comparative Example 6 | $Li_{1.05}(Ni_{0.35}Co_{0.35}Mn_{0.3})_{0.95}O_{1.9}F_{0.1}$ | $Li_2S-P_2S_5$ | 53.8 |

(Discussion)

Figure 2:
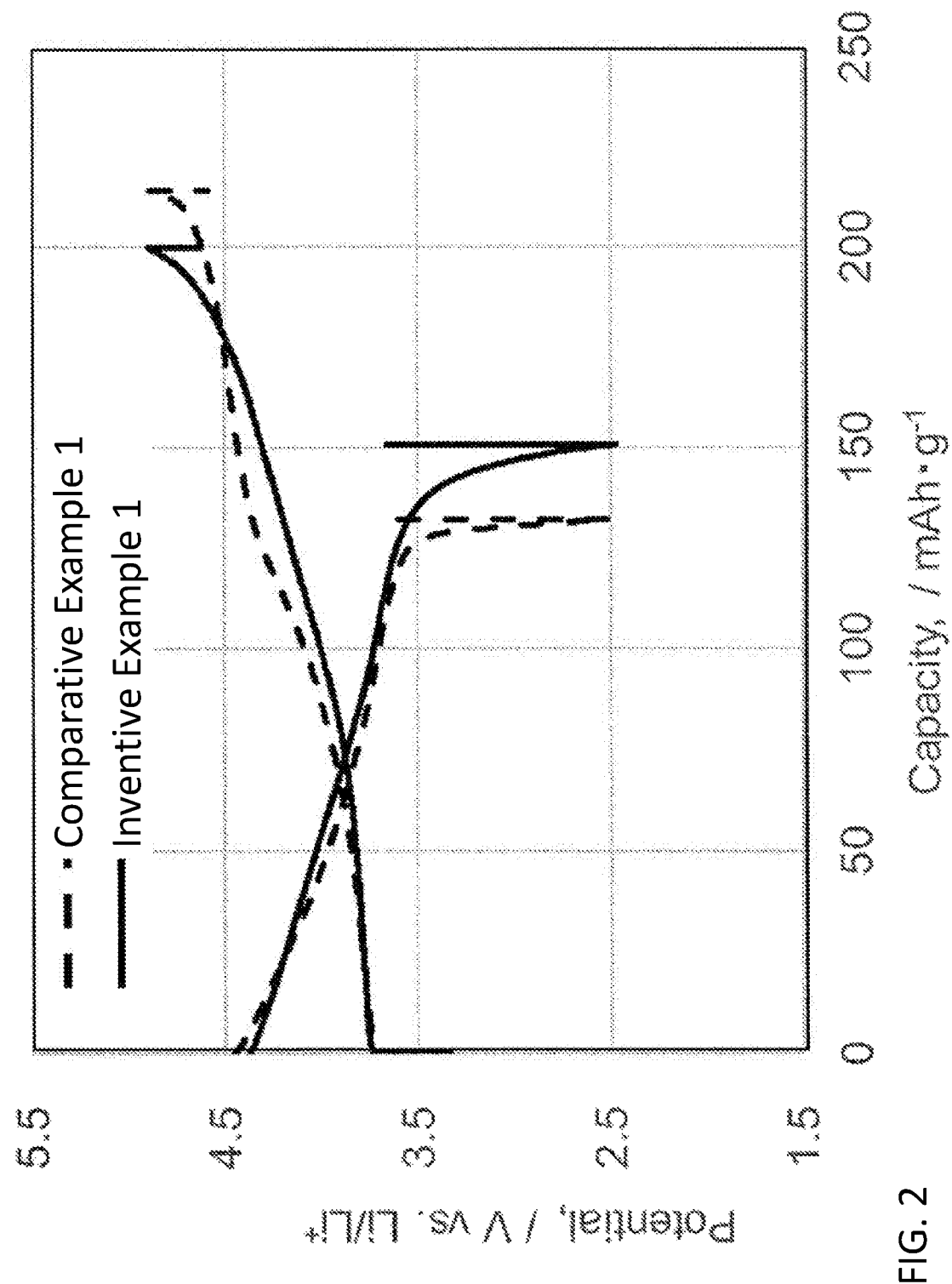
FIG. 2 is a graph showing initial charge/discharge characteristic of all-solid batteries in the inventive example 1 and the comparative example 1.

FIG. 2 is a graph showing the initial charge/discharge characteristic of the all-solid secondary batteries according to the inventive example 1 and the comparative example 1.

From the results of the inventive example 1 and the comparative example 1 shown in FIG. 2 and Table 1, it was confirmed that the charge/discharge efficiency was improved by using the metal oxyfluoride and the halide as the positive electrode active material and the solid electrolyte, respectively, for the positive electrode.

From the results of the inventive examples 1 to 4 and the comparative examples 1 to 4 shown in Table 1, a similar effect was confirmed also in the halide solid electrolytes other than $Li_3YCl_6$.

As is clear from the comparison of the comparative example 6 to the comparative example 5, the charge/discharge efficiency is lower in a case where the metal oxyfluoride and the sulfide solid electrolyte are used respectively as the positive electrode active material and the solid electrolyte (see the comparative example 6) than in a case where the metal oxide and the sulfide solid electrolyte are used respectively as the positive electrode active material and the solid electrolyte (see the comparative example 5). This is probably because the sulfide solid electrolyte reacted with fluorine atoms included in the metal oxyfluoride to form a resistance layer.

INDUSTRIAL APPLICABILITY

The battery according to the present disclosure can be used as, for example, an all-solid lithium secondary battery.

REFERENTIAL SIGNS LIST

1000 Battery
101 Positive electrode
102 Electrolyte layer
103 Negative electrode
104 Positive electrode active material particle
105 First solid electrolyte particle

The invention claimed is:

1. A positive electrode material, comprising:
a positive electrode active material particle and a first solid electrolyte material particle,
wherein the positive electrode active material particle and the first solid electrolyte material particle are in contact with each other,
the first solid electrolyte material particle is represented by the following composition formula:

$Li_aM_bY_cX_6$,

M is at least one selected from the group consisting of Mg, Ca, Sr, Ba, Zn, Sc, Al, Ga, Bi, Zr, Hf, Ti, Sn, Ta, and Nb, X is at least one selected from the group consisting of Cl, Br, and I, $a+m'b+3c=6$, $a>0$ and $c>0$ are satisfied, m' represents a valence of M, and the positive electrode active material particle includes a metal oxyfluoride represented by the following composition formula:

$Li_pMe_qO_mF_n$, where

Me is at least one selected from the group consisting of Mn, Co, Ni, Fe, Al, Cu, V, Nb, Mo, Ti, Cr, Zr, Zn, Na, K, Ca, Mg, Pt, Au, Ag, Ru, W, B, Si, and P, n' represents a valence of Me, $0.5 \leq p \leq 1.5$, $0.5 \leq q \leq 1.0$, $1 \leq m < 2$;

$p+n'q=2m+n$, and $0 < n \leq 1$.

2. The positive electrode material according to claim 1, wherein the first solid electrolyte material particle is represented by at least one selected from the group consisting of $Li_3YCl_6$, $Li_3YBr_6$, $Li_{2.5}Y_{0.5}Zr_{0.5}Cl_6$, and $Li_3YBr_2Cl_2I_2$.

3. The positive electrode material according to claim 1, wherein the metal oxyfluoride has a composition of $Li_{1.05}(Ni_{0.35}Co_{0.35}Mn_{0.3})_{0.95}O_{1.9}F_{0.1}$.

4. A battery comprising:
a positive electrode comprising the positive electrode material according to claim 1;
a negative electrode; and
an electrolyte layer provided between the positive electrode and the negative electrode, wherein the electrolyte layer includes at least one of the first solid electrolyte material particle, an oxide solid electrolyte, a polymer solid electrolyte, a sulfide solid electrolyte, and a complex hydride solid electrolyte.

5. The battery according to claim 4, wherein
the electrolyte layer includes the first solid electrolyte material particle.

6. The positive electrode material according to claim 1, wherein
M is Zr.

7. The positive electrode material according to claim 1, wherein
the first solid electrolyte material particle is represented by the following composition formula:

$Li_{6-3c}Y_cX_6$ or $Li_{2.5}Y_{0.5}Zr_{0.5}Cl_6$, and $0 < c < 2$ is satisfied.

* * * * *